(12) United States Patent
Östergård et al.

(10) Patent No.: US 6,704,004 B1
(45) Date of Patent: Mar. 9, 2004

(54) ARRANGEMENT FOR INTEGRATION OF KEY ILLUMINATION INTO KEYMAT OF PORTABLE ELECTRONIC DEVICES

(75) Inventors: Toni Östergård, Turku (FI); Terho Kaikuranta, Piispanristi (FI); Bror Svarfvar, Kaarina (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/641,199

(22) Filed: Aug. 17, 2000

(51) Int. Cl.[7] .................................................. G09G 5/00
(52) U.S. Cl. ..................... 345/170; 178/18.11; 200/5 A
(58) Field of Search ..................... 178/18.11; 359/145; 345/170–173, 102; 200/5 A, 314; 40/542; 340/815.56; 362/24; 379/368; 313/506

(56) References Cited

U.S. PATENT DOCUMENTS

| | | | |
|---|---|---|---|
| 4,022,993 A | | 5/1977 | Shattuck .................. 200/5 A |
| 4,320,268 A | * | 3/1982 | Brown .................. 200/5 A |
| 4,447,692 A | | 5/1984 | Mierzwinski ........ 219/10.55 B |
| 4,532,395 A | | 7/1985 | Zukowski .................. 200/314 |
| 4,551,717 A | | 11/1985 | Dreher .................. 340/712 |
| 5,065,357 A | * | 11/1991 | Shiraishi et al. ............ 345/102 |
| 5,404,133 A | * | 4/1995 | Moriike et al. ........ 340/815.56 |
| 5,570,114 A | * | 10/1996 | Fowler .................. 345/173 |
| 5,736,973 A | * | 4/1998 | Godfrey et al. .......... 178/18.11 |
| 5,747,756 A | * | 5/1998 | Boedecker ............. 200/5 A |
| 5,797,482 A | * | 8/1998 | LaPointe et al. ......... 200/314 |
| 5,898,276 A | | 4/1999 | Tsuruoka et al. ........ 315/169.3 |
| 5,971,557 A | * | 10/1999 | Kubes et al. ............ 362/24 |
| 6,002,946 A | * | 12/1999 | Reber et al. ............ 359/145 |
| 6,100,478 A | * | 8/2000 | LaPointe et al. ......... 200/314 |
| 6,148,075 A | * | 11/2000 | Inubushi et al. ......... 379/368 |
| 6,246,169 B1 | * | 6/2001 | Pruvot .................. 313/506 |
| 6,658,773 B2 | * | 12/2003 | Rohne et al. ............. 40/542 |

FOREIGN PATENT DOCUMENTS

| | | | | |
|---|---|---|---|---|
| EP | 8137487 | | 5/1996 | ......... G10K/15/04 |
| EP | 0809420 | | 11/1997 | ......... H05B/33/00 |
| GB | 2343933 | | 5/2000 | ............ F02F/3/22 |
| WO | 9918590 | | 4/1999 | ......... H01H/13/70 |
| WO | 0055879 | | 9/2000 | ........... H01H/9/16 |

* cited by examiner

Primary Examiner—Steven Saras
Assistant Examiner—Srilakshmi K. Kumar
(74) Attorney, Agent, or Firm—Ware, Fressola, Van Der Sluys & Adolphson LLP

(57) ABSTRACT

An integrated keymat or keyboard to be used on an electronic device. The integrated keymat includes a plurality of individual emissive keypads each having a legend or symbol provided thereon. The emissive keypad has a light-emitting source and a plurality of electrodes, operatively connected to a power source, to activate the light-emitting source in order to illuminate the keypads, wherein the connection of the electrodes is controllable so that one or more keypads can be illuminated causing the key indicating marks on said one or more keypads to become more visible. Furthermore, the light-emitting source may include a plurality of segments of pixels which are individually addressable so that they can be selectively activated to form an alphanumeric symbol or pattern. Moreover, the integrated keymat further comprises one or more lens-like pads provided on the keypads to make the legend or symbol on the keypads more visible.

51 Claims, 16 Drawing Sheets

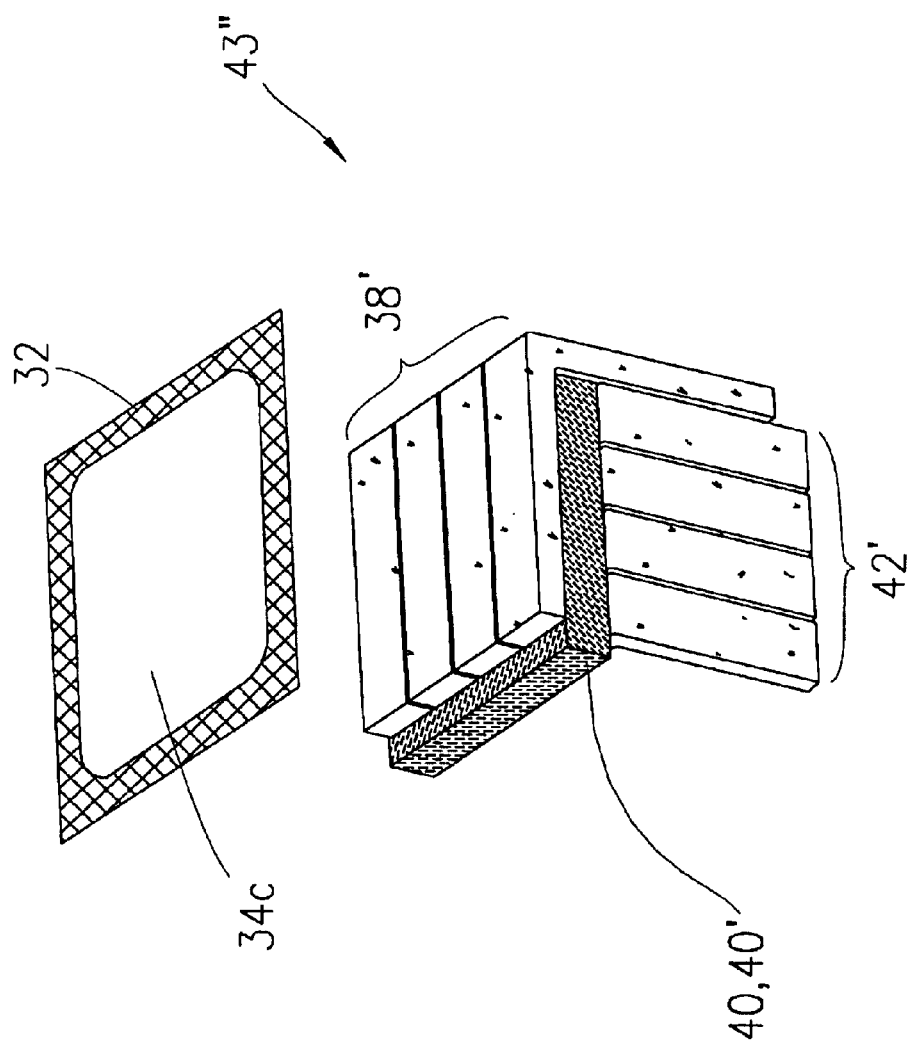

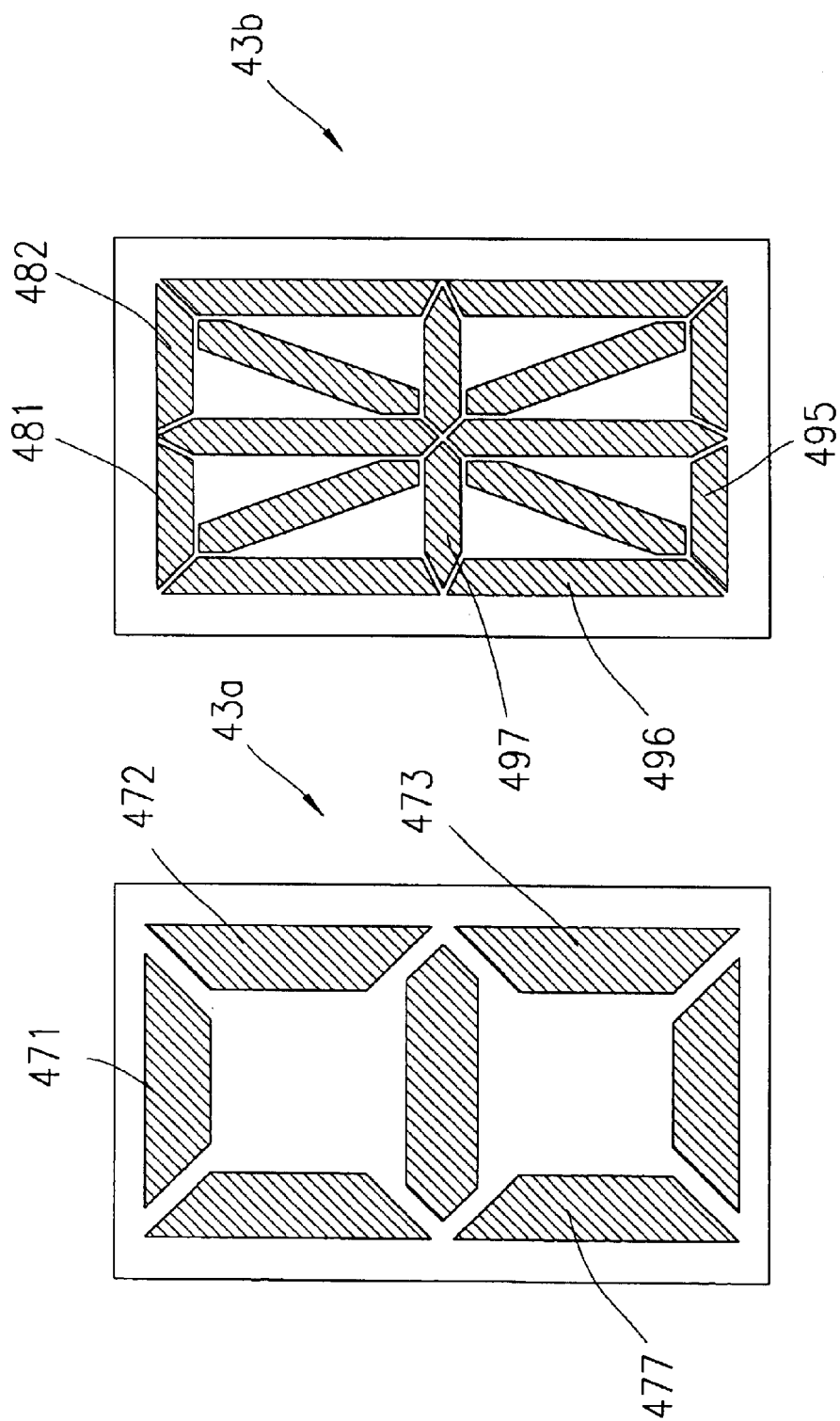

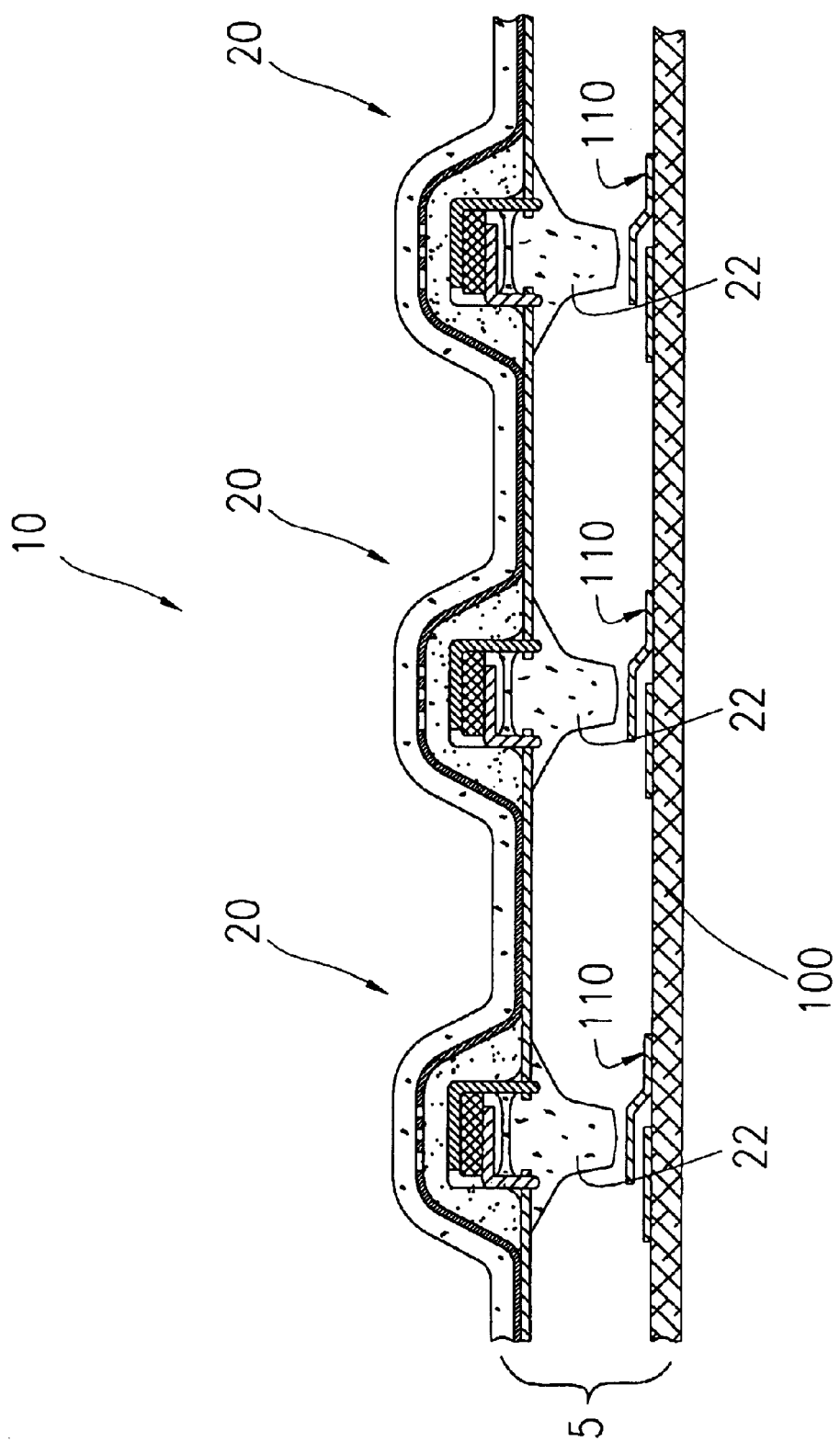

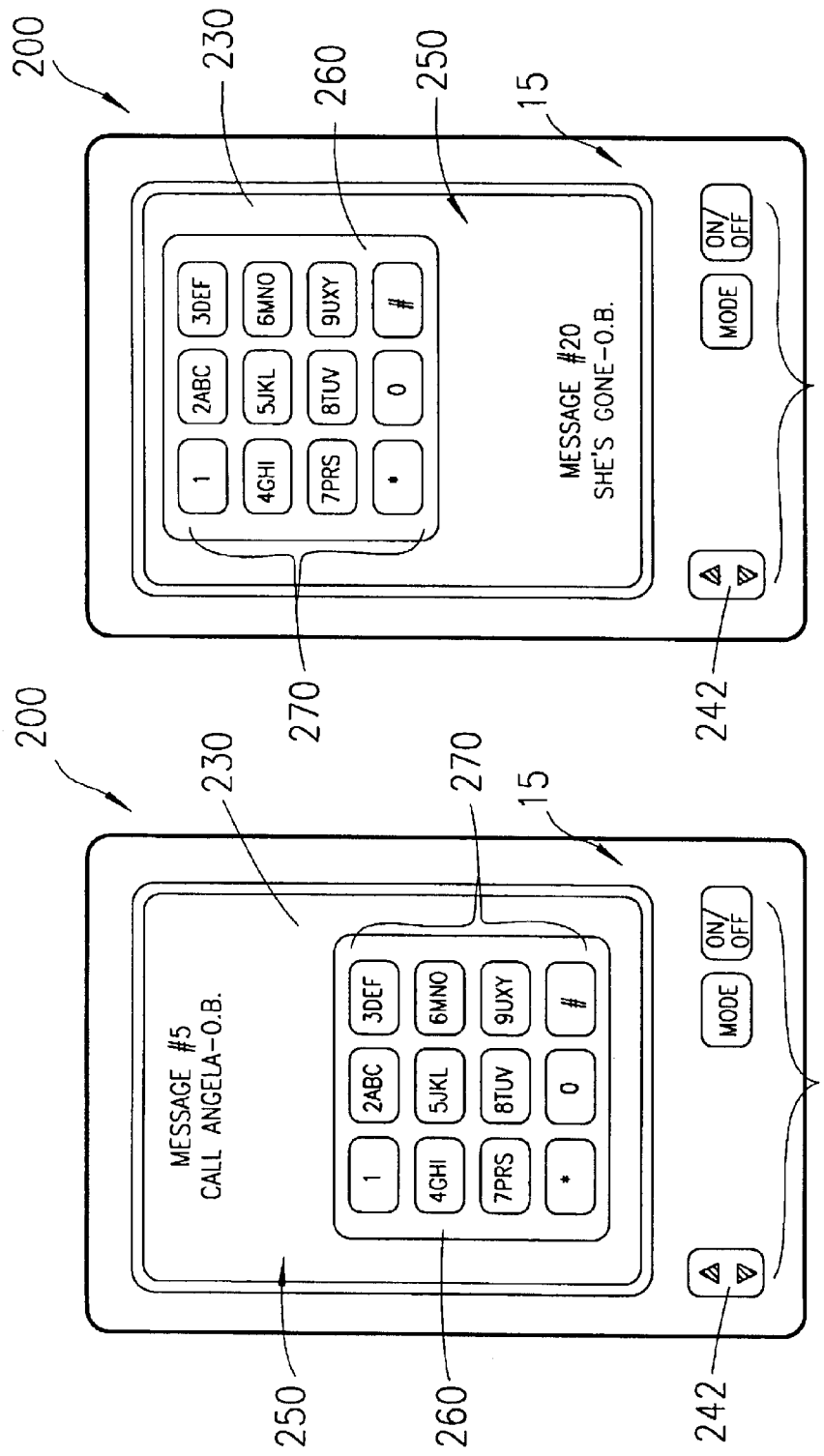

ARRANGEMENT FOR INTEGRATION OF KEY ILLUMINATION INTO KEYMAT OF PORTABLE ELECTRONIC DEVICES

CROSS-REFERENCE TO RELATED APPLICATION

Reference is made to application Ser. No. 09/641,286 entitled "INTEGRATION OF ORGANIC LIGHT-EMITTING COMPONENTS INTO THE KEYMAT OF AN ELECTRONIC DEVICE" by Toni Östergård, Terho Kaikuranta, Bror Svarfvar, assigned to the assignee of this application and filed on even date herewith.

FIELD OF THE INVENTION

The present invention relates generally to a keymat or keyboard to be used on a portable electronic device and, more particularly, to a keymat or keyboard that has a plurality of illuminated keypads.

BACKGROUND OF THE INVENTION

In a portable electronic device, such as a mobile phone, a communicator, a personal data assistant (PDA), a portable communications device or the like, a keyboard is usually used to provide a User Interface (UT) between the user and the device. Typically, the keyboard includes a plurality of alphanumerical keypads and/or function keys to allow a user to select a function or to key a value into the device. When the ambient lighting is inadequate, it is essential that the keypads or keys are illuminated so that the user can correctly select the keys.

In a conventional illuminated keyboard including a keymat and an underlying circuit board, discrete light-emitting devices (LEDs) are surface-mounted on the circuit board to provide illumination to the keypads thereabove. Alternatively, light guides or conduits are used to guide light from one or more light sources on the circuit board to the proximity of the keypads. Conventionally, all the LEDs mounted on the circuit board, as described above, are turned on or off at the same time. Thus, like the light guides, the LEDs for illuminating the keypads cannot be selectively controlled. Furthermore, the surface-mounted LEDs are bulky and their power consumption is usually high. Because of their bulkiness and high power consumption, these surface-mounted LEDs are not optimal for use in a small portable electronic device.

On a mobile phone, a communicator and any other portable communications device, there is usually an information display panel, such as an LCD panel, for providing information to the user. Typically, one or more softkeys are used to guide the user to operate the device. A softkey has a function displayed at a designated area of the display panel and an associated keypad located outside the display panel adjacent to the designated area. A user can use the associated keypad to choose the function of the softkey. For example, two softkeys are often used in a Nokia mobile phone to assist a user to operate the mobile phone. When the mobile phone is turned on, the initial functions of these two softkeys are shown as "Menu" and "Name" at their corresponding designated areas. By choosing the "Menu" function through the associated keypad, the displayed functions of the two softkeys will change to "Select" and "Exit". The "Select" and "Exit" functions are "requests" to the user, asking the user to choose the next course of action regarding the use of the mobile phone. In this way, the user is provided with a guide to operate the device according to the displayed functions of the softkeys at a given moment. However, this type of softkey has several disadvantages, as described below. Because the function of the softkey is shown at a designated area within the display panel, the use of softkeys significantly reduces the available area for displaying other messages on the display panel. Thus, for practical reasons, the number of softkeys is limited to only a few. Moreover, it has been found that some users are confused over the "requests" shown at the designated areas of the display panel and usually cannot relate the requests to the associated keypads. This psychological obstacle is a real problem for traditional softkeys.

It is advantageous and desirable to provide a keymat, wherein the illuminating light sources are small and have low power consumption, and wherein illumination of the keypads can be selectively controlled. Furthermore, the illuminated keypad areas can include alphabetical letters, numerals, text and/or graphical images to indicate the functions of the keypads so that these keypads can be used to replace the softkeys in certain portable electronic devices.

SUMMARY OF THE INVENTION

It is an objective of the present invention to provide an integrated keymat to be used on a portable electronic device, wherein the keymat includes one or more emissive keypads having legends or other key indicating marks provided thereon, and wherein the keypads can be individually illuminated so as to allow the legends on the keypads to become more visible. Accordingly, the keymat comprises separate light-emitting components provided on the emissive keypads and electrodes for activating the light-emitting components in order to illuminate the keypads, wherein the electrodes are operatively connected to electrical connectors which provide electrical power to the electrodes, and wherein the electrical connections to the electrodes are controllable so that the keypads can be selectively illuminated.

Preferably, the light-emitting component in a keypad comprises a single light-emitting pixel to illuminate the legend on the keypad.

Alternatively, the light-emitting component in a keypad comprises two or more light-emitting pixels which can be selectively activated to illuminate one or more segments of the legend on the keypad.

Alternatively, the light-emitting component in a keypad comprises a plurality of light-emitting pixels forming a pixel matrix, wherein the pixels of the matrix are individually addressable so as to allow one or more pixels within the keypad to be selectively activated to form a selectable illuminating pattern.

Alternatively, the light-emitting component in a keypad comprises a plurality of light-emitting segments, wherein the segments are individually addressable so as to allow one or more segments within the keypad to be selectively activated to form an illuminating pattern in a form of an alphanumerical or other symbol.

The integrated keymat of the present invention can be integrated into a circuit board having a control circuit which controls the activation of the light-emitting components, wherein the circuit board can be rigid, flexible or of any other form.

The integrated keymat of the present invention can be integrated into a circuit board having a display panel which can be used to display information related to the activated light-emitting components, wherein the circuit board can be rigid, flexible or of any other form.

Preferably, the integrated keymat of the present invention further includes all the required circuitry to control all the components on the integrated keymat in order to minimize the number of electrical contacts to the keymat down to a few power supply contacts and data line contacts.

It is possible that the integrated keymat also includes one or more transparent, magnifying pads to magnify the legends on the keypads or the legends on a display area.

It is also possible that the emissive keypads be separately integrated into a circuit board having a control circuit which controls the activation of the light-emitting components, wherein the circuit board can be rigid, flexible or of any other form.

The present invention will become apparent upon reading the description taken in conjunction with FIGS. 1 to 11b.

BRIEF DESCRIPTION OF THE DRAWINGS

FIG. 2c is a diagrammatic representation illustrating the keypad effectively comprising a plurality of segments, which can be selectively activated, arranged into a matrix.

FIG. 3a is a diagrammatic representation illustrating the keypad effectively comprising a plurality of segments, which can be selectively activated to form a numeral.

FIG. 3b is a diagrammatic representation illustrating the keypad effectively comprising a plurality of segments, which can be selectively activated to form an alphanumerical symbol.

FIG. 4 is a diagrammatic representation showing the integrated keymat having means to activate a plurality of contact switches in an electronic device.

FIG. 6 is a front view illustrating an integrated keymat, which can be used on a mobile telephone.

FIG. 7a is a front view illustrating an integrated keyboard having a display area, wherein the keypads are placed at one location.

FIG. 7b is a front view illustrating the same integrated keyboard, wherein the keypads are placed at another location.

DETAILED DESCRIPTION

Figure 1A:
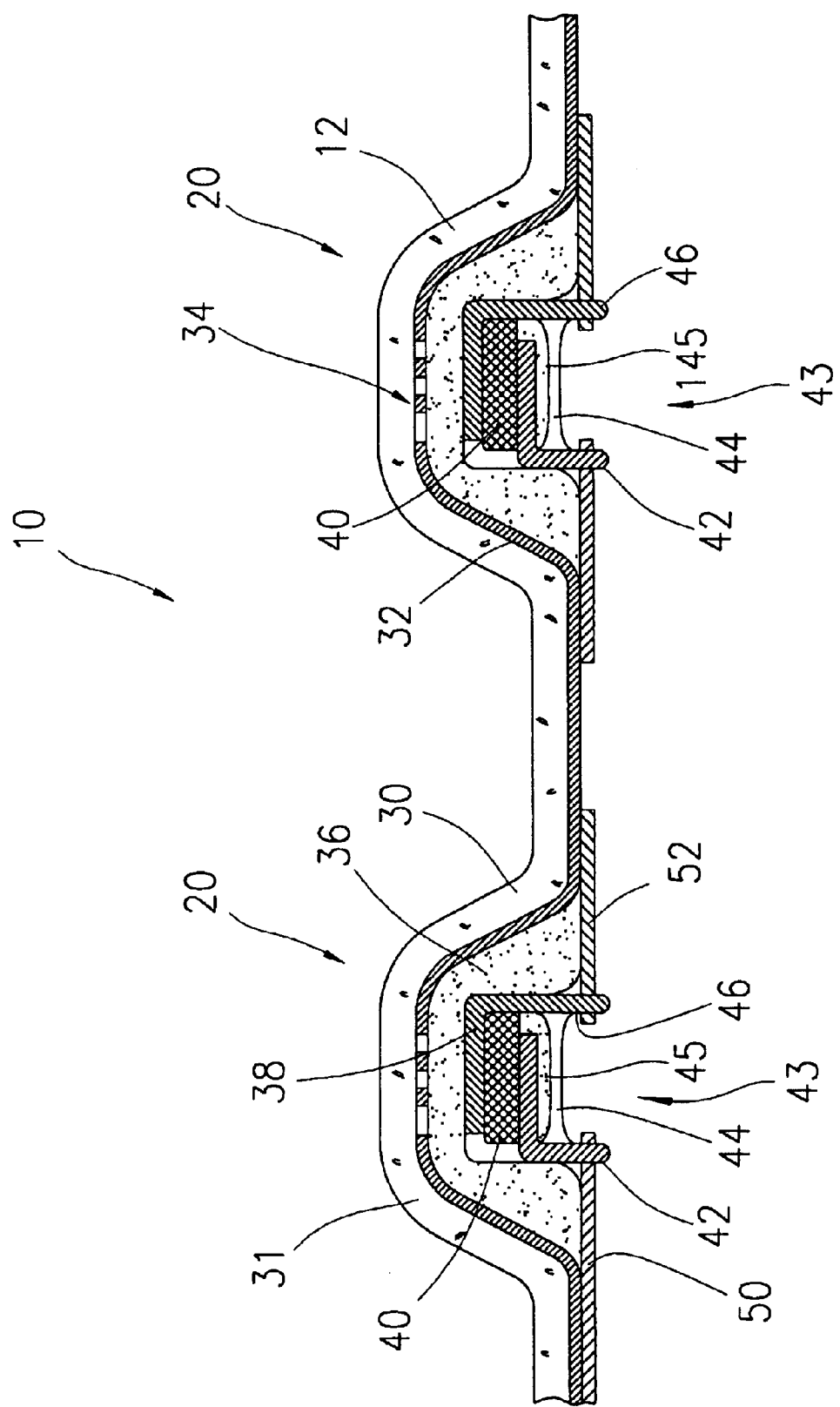
FIG. 1a is a diagrammatic representation showing the preferred embodiment of the integrated keymat, according to the present invention, wherein the light-emitting layer in the keypad is made of an organic light-emitting material.
Figure 1B:
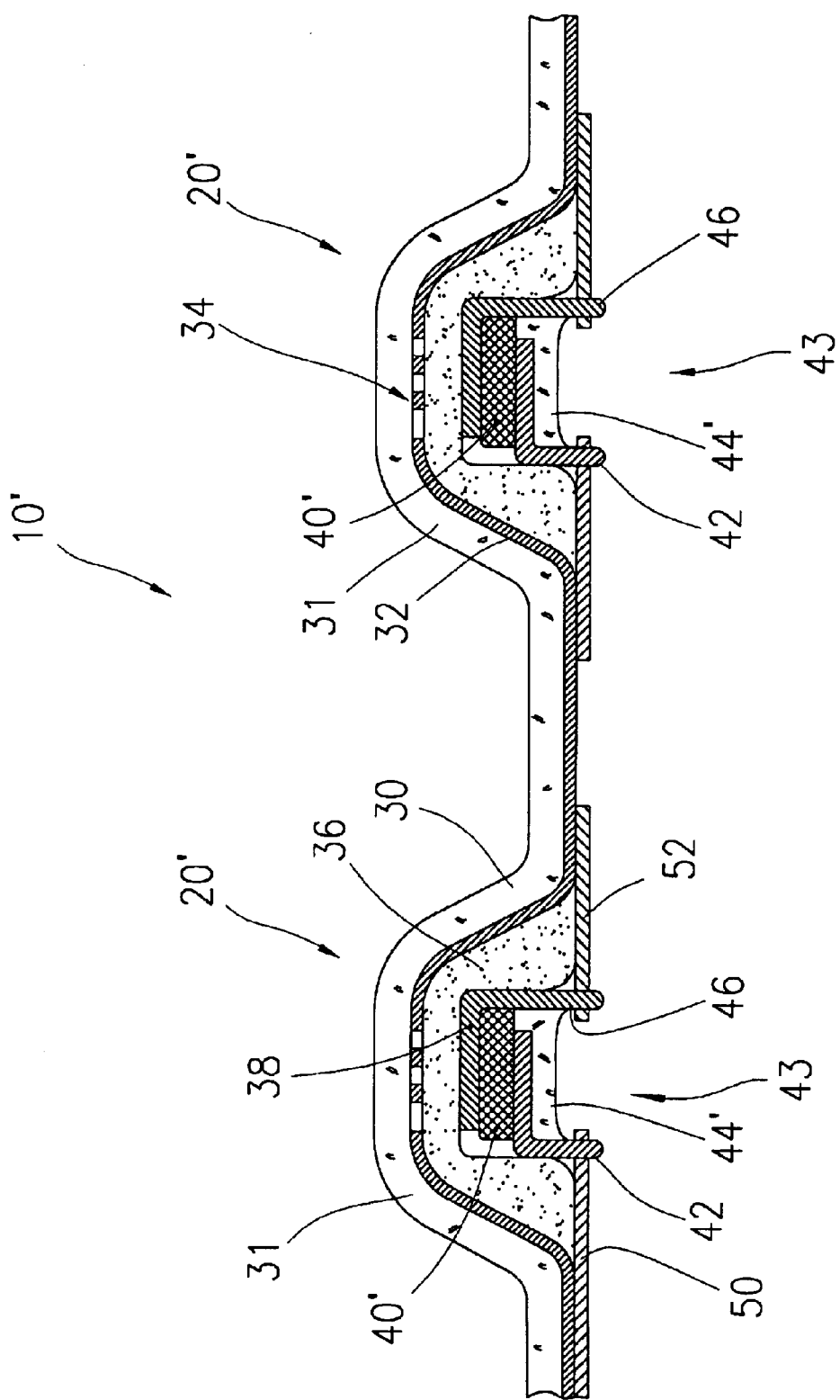
FIG. 1b is a diagrammatic representation showing the same embodiment with the light-emitting layer being made of an inorganic light-emitting material.

FIG. 1a illustrates an integrated keymat 10 having a plurality of emissive keypads 20 to be used on a portable electronic device. The keymat 10 includes a top layer 30 which can be formed from a plastic sheet or any other suitable material. Preferably, the top layer 30 is reasonably flexible to allow a user to push the keypads 20 downward to select a function or enter a value into the electronic device. The top layer has a masking layer 32 to provide a legend or a marking 34 (see FIGS. 2a–2b) to each keypad 20. As shown, the top layer 30 has a plurality of recesses 31 for forming the keypads 20. It is preferable that the keypads 20 be partially filled with a transparent or translucent plastic filling 36, or any other suitable material such as glass, metal and ceramic, to add mechanical strength to the individual keypads 20. To make the keypads 20 emissive, a transparent top electrode layer 38, a light-emitting layer 40, and a bottom electrode layer 42 together form a light-emitting source 43 (see FIGS. 2a–2c) for each keypad 20. The top electrode layer 38 can be deposited directly on the filling 36, followed by the placement of the light-emitting layer 40 and the bottom electrode layer 42. Alternatively, one or more of the components, including the top electrode layer 38, the light-emitting layer 40 and the bottom electrode layer 42, can be introduced as a solid form into the recess 31. The light-emitting source 43 can be a single pixel, as shown in FIG. 2a, or a plurality of segments, as shown in FIGS. 2b, 2c, 3a and 3b. Preferably, the light-emitting layer 40 is made from one or more organic materials. The organic materials can be molecular, and they can be directly deposited into the inside of the keypad by vacuum evaporation or sublimation. The organic materials can also be polymeric, commonly known as light-emitting polymers (LEPs), and they can be printed within the recess 31 of the keypad 20 with an inkjet printer or a similar machine. Devices based on the organic light-emitting materials are also known as organic light-emitting devices (OLEDs), as opposed to regular LEDs, which are made of inorganic materials. Alternatively, the light-emitting layer can be made of screen-printed electroluminescence (EL) pixels, inorganic LEDs or other discrete light-emitting devices, as shown in FIG. 1b. It is preferred that the light-emitting layer 40 be hermetically sealed with an encapsulation material 44, with only the electrical connections to the light-emitting layer 40 being exposed to the outside of the encapsulation. If necessary, an extension electrode 46 is provided to electrically expose the top electrode 38 outside the encapsulation material 44 for electrical connections. Preferably, a gap 45 is provided between the encapsulation material 44 and the light-emitting layer 40 for filling therewith one or more protective gases 145, such as nitrogen ($N_2$) and argon (Ar). It should be noted that it is possible to fabricate the light-emitting source 43, which includes the electrodes 38, 42, 46 and the light-emitting layer 40, separately from the top layer 30 and secure this illuminating source to the recess 31. As shown in FIG. 1a, the keymat 10 further comprises electrical connectors 50, 52 for providing electrical power to the light-emitting source 43 for activating the light-emitting layer 40. It is preferred that the emissive keypads 20 are individually addressable so that they can be selectively illuminated.

FIG. 1b illustrates a keymat 10', which is basically the same as the keymat 10 shown in FIG. 1a, except that the light-emitting layer is not organic. As shown the FIG. 1b, the light-emitting layer 40' can be made of screen-printed electroluminescence (EL) pixels, inorganic LEDs or other discrete light-emitting devices. With these inorganic light-emitting materials, it may not be necessary to provide a gap 45 between the encapsulation layer and the light-emitting layer for filling with a protective gas. Thus, as shown in FIG. 1b, it is possible to have an encapsulation layer 44' to be provided directly on the bottom electrode layer 42 and in contact with the light-emitting layer 40'.

Figure 1C:
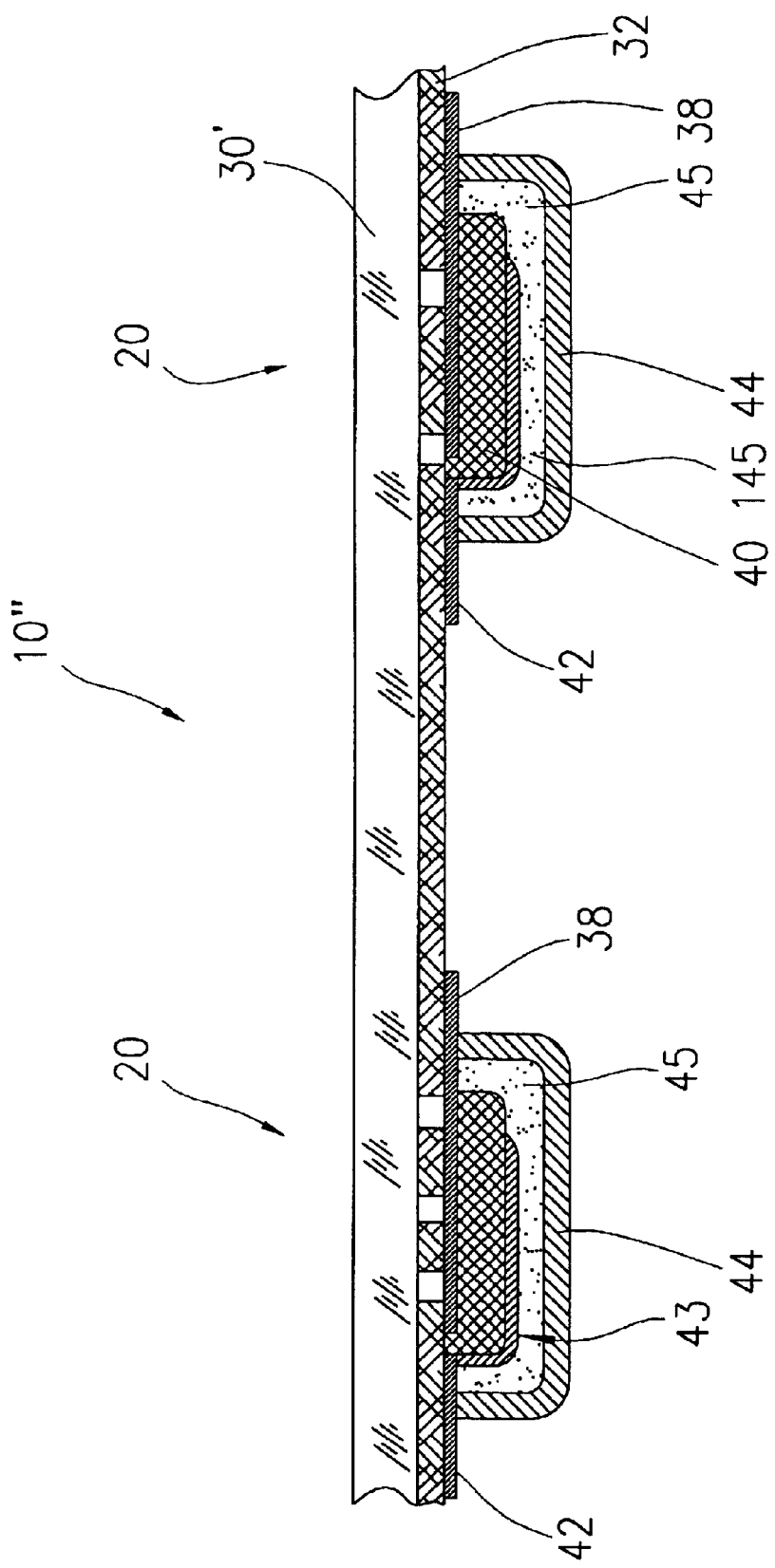
FIG. 1c is a diagrammatic representation showing another embodiment of the integrated keymat.

FIG. 1c illustrates a keymat 10", which is basically the same as the keymat 10 shown in FIG. 1b, except that the top layer 30' is substantially flat and has no recesses. As shown in FIG. 1c, the light-emitting source 43, which includes the top electrode layer 38, the light-emitting layer 40 and the bottom electrode layer 42, can be implemented directly on the top layer 30', without the need of the filling 36. Likewise, the encapsulation layer 44 is directly provided on the top layer 30'.

Figure 2B:
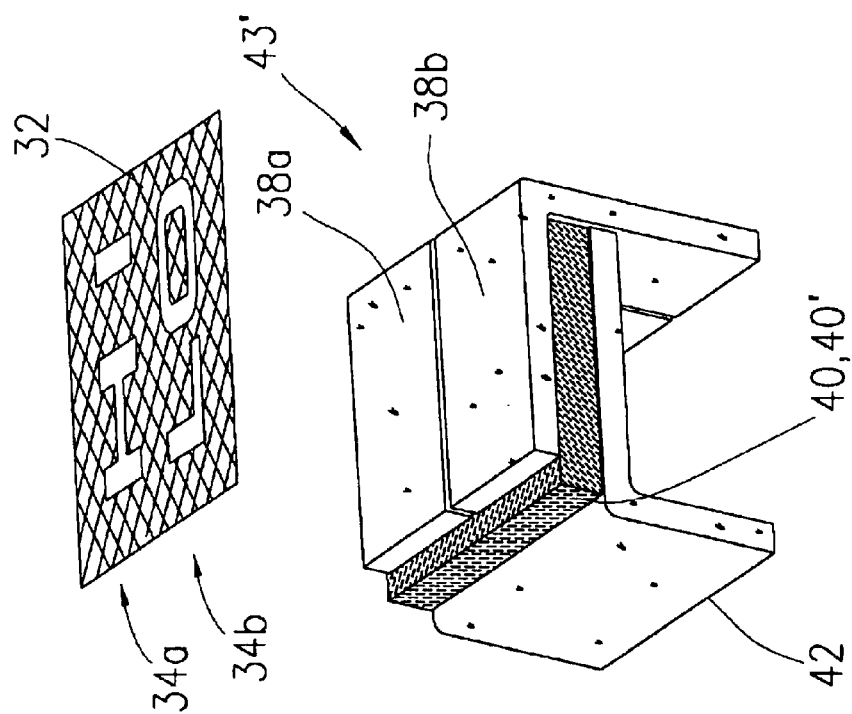
FIG. 2b is a diagrammatic representation illustrating the keypad effectively comprising two segments, which can be selectively activated.
Figure 2A:
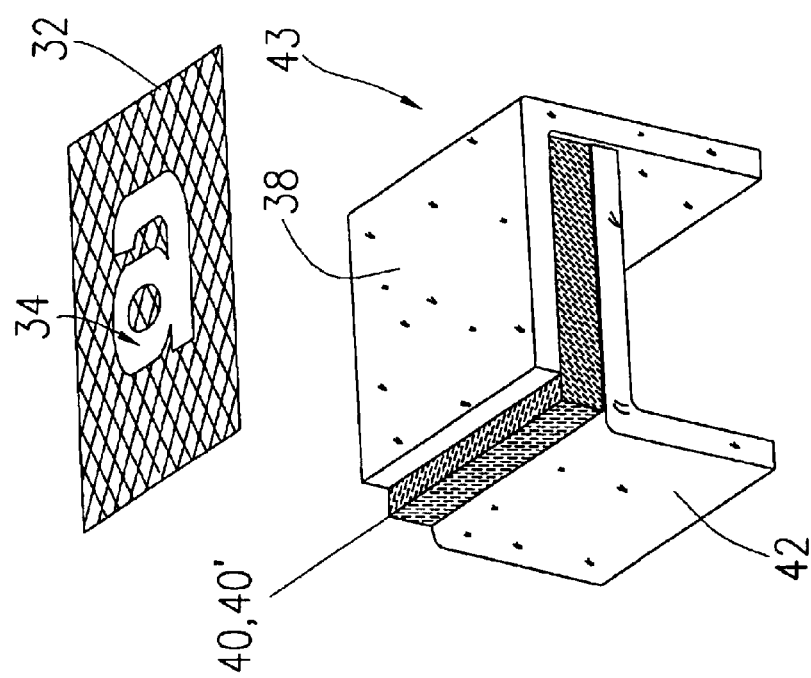
FIG. 2a is a diagrammatic representation illustrating the light-emitting layer is effectively a single pixel or segment.

FIGS. 2a to 2c illustrate different configurations of the emissive keypads. As shown in FIG. 2a, the light-emitting source 43 comprises basically a single light-emitting pixel for illuminating substantially the entire surface of a keypad 20. In that case, it is preferable to have a masking layer 32 which includes clear and opaque areas to form a clear pattern for the text, legend or symbol that is used as the marking 34. As shown in FIG. 2a, the marking 34 is a letter "a".

As shown in FIG. 2b, the top transparent electrode layer 38 includes two top transparent electrodes 38a and 38b, and the light-emitting source 43' effectively comprises two light-emitting pixels or segments: one defined by the top transparent electrode layer 38a and one defined by the electrode layer 38b. The top electrodes 38a, 38b are selectively controllable so that one or both pixels thereunder can be activated to illuminate one or more segments of the keypad surface. In that case, the marking 34 above the illuminating source can have one or more legends or symbols 34a, 34b. For example, when the bottom electrode 42 and the top electrode 38a supply electrical power to activate the light-emitting layer 40, 40', the legend "HI" of the marking 34 is illuminated. Likewise, when the bottom electrode 42 and the top electrode 38b supply electrical power to activate the light-emitting layer 40, 40', the legend "LO" of the marking 34 is illuminated.

It is possible for the light-emitting source 43" to be effectively produced as a matrix of pixels or segments, as shown in FIG. 2c. To illustrate the pixel matrix, FIG. 2c simplistically depicts a matrix of 4×4 pixels which can be selectively activated by a group of four top electrodes 38' and a group of four bottom electrodes 42'. The individual pixels in the light-emitting layer 40 are addressable by a control circuit (not shown) through the electrodes 38' and 42'. In this case, it is possible to form a symbol or legend by selectively activating the pixels, and the masking layer 32 may simply have a window 34c to define the keypad surface area, as shown in FIG. 2c.

It is also possible for the light-emitting source to be produced as a segmented-type display. As shown in FIG. 3a, the light-emitting source 43a effectively comprises seven segments 471, 472, . . . , 477, which are individually addressable so that they can be selectively activated to form a numeral. Alternatively, the light-emitting source 43b can have sixteen segments 481, 482, . . . , 496, which are individually addressable so that they can be selectively activated to form an alphabetical letter, a numeral or a simple mathematical symbol, as shown in FIG. 3b.

The group of pixels, as shown in FIGS. 2b and 2c, or the group of segments, as shown in FIGS. 3a and 3b, can be addressed passively (passive-matrix addressing) or actively (active-matrix addressing). Preferably, these pixels or segments are implemented using organic light-emitting materials.

Currently, very high-resolution, small, inorganic emissive displays can be produced using the active-matrix electroluminescence (AMEL) technology. Products with a 640×480 pixels resolution on an active area of approximately 1.55× 1.14 $cm^2$ are already available. The AMEL technology can also be used to produce the light-emitting source 43 for the individual keypads 20.

Figure 8A:
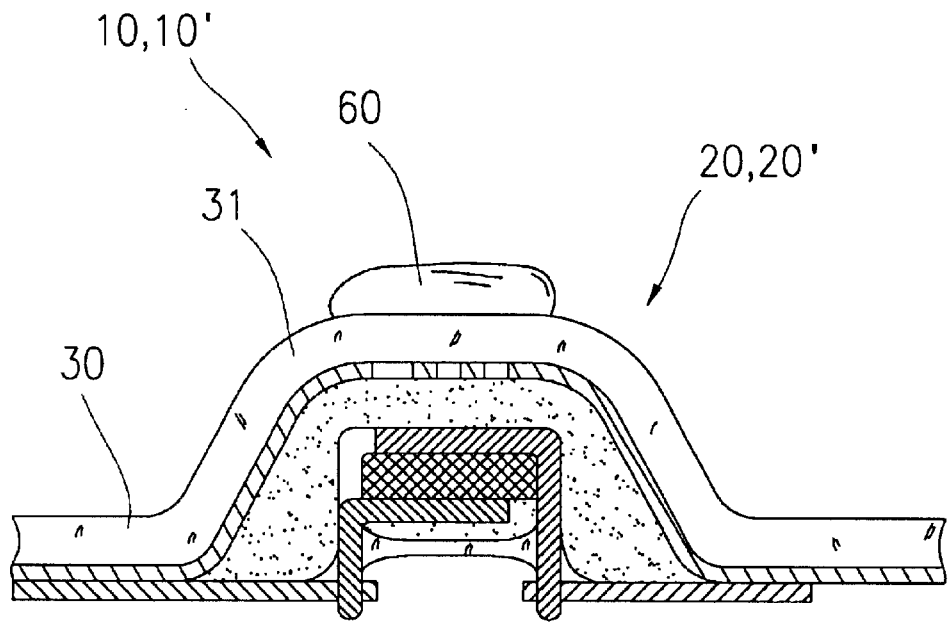
FIG. 8a is a diagrammatic representation illustrating a transparent, lens-like pad provided on a keypad, which is made on a top layer having recesses.
Figure 8B:
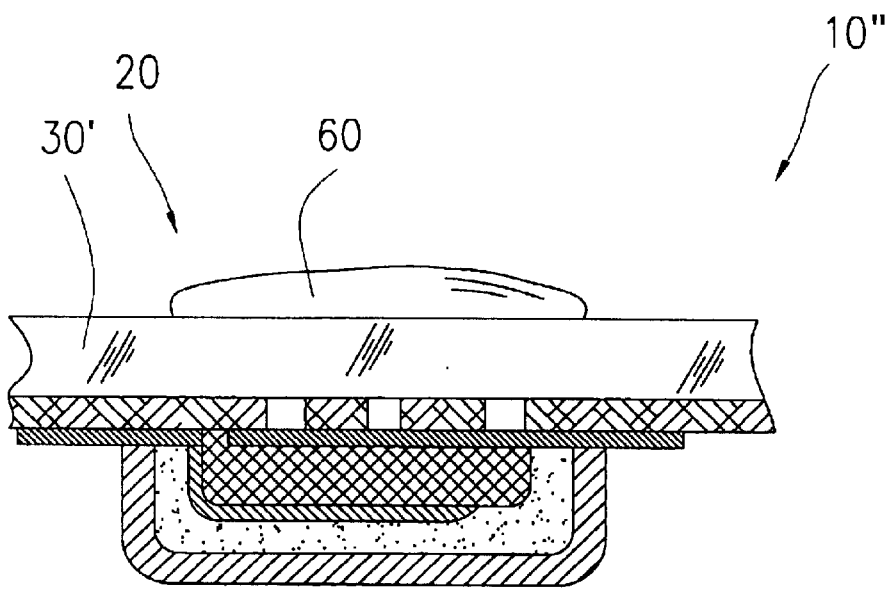
FIG. 8b is a diagrammatic representation illustrating a transparent, lens-like pad provided on a keypad, which is made on a flat top layer.

With a sufficiently large number of pixels in each light-emitting source 43, the same keypad 20 can be programmed to show different texts or graphics (see FIGS. 7a and 7b), if so desired. Such a matrix-type light-emitting source, or the segmented-type light-emitting source, as shown in FIGS. 3a and 3b, can help achieve a user-interface (UI)-style keymat, with just a few emissive keypads 20. These matrix and segmented-types of light-emitting sources make it easy to change the operating modes of an electronic device from one to another without changing the keymat. For example, the same electronic device can be used as a mobile phone, a PDA or a sophisticated calculator. Furthermore, the matrix or segmented light-emitting source allows the user to program each and every key of an electronic device to show the function for each key in a specific situation. Likewise, the matrix or segmented light-emitting source allows the user to place a keyboard at different positions on an electronic device. For example, the keyboard can be placed to the right of the main display or to the left of the main display. The keyboard can also be placed below or above the main display, with the text on the keypads oriented in the same direction as the text on the main display, as shown in FIG. 8a and 8b.

FIG. 4 is a diagrammatic representation of a section of a keyboard 5, which includes an integrated keymat 10 implemented on top of a circuit board 100. Usually, each keypad 20 allows a user to select a function or key in a value through a switch 110 on the circuit board 100. As shown in FIG. 4, a plurality of switch activation pins 22 are provided to the keypads 20 to allow a user to selectively activate the switches 110. The switches 110 shown in FIG. 4 are contact switches that have mechanical components on them. However, it is possible to use touch-sensitive switches instead. In that case, it is also possible to provide one or more capacitive/conductive elements (not shown) on or near the keypad 20 so as to allow the user to activate a switch, in a manner similar to a touch-screen. The mechanical and touch-sensitive switches are well known in the art.

Figure 5A:
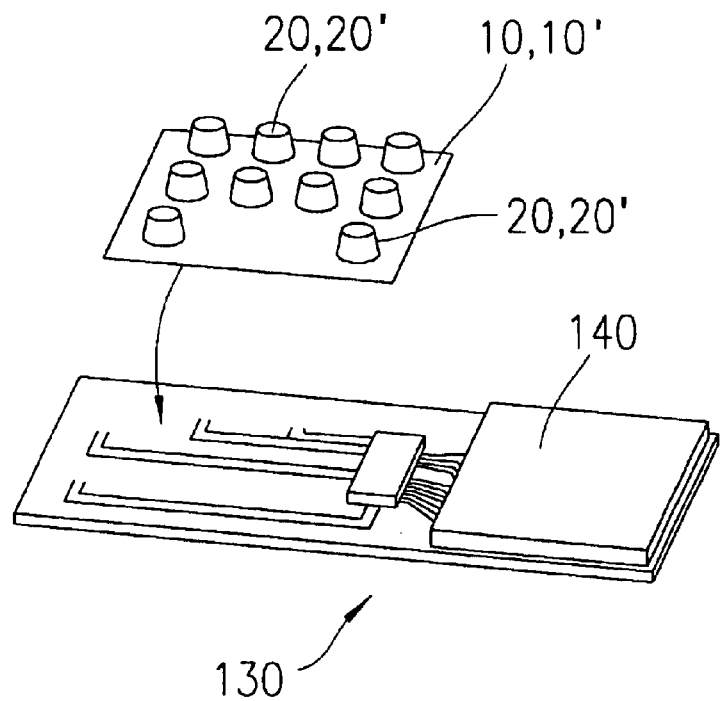
FIGS. 5a is a diagrammatic representation illustrating the integration of an integrated keymat with an LCD flex.

The integrated keymat 10 can be integrated onto an LCD flex 120, which includes a circuitry section 130 and an LCD display panel 140, as shown in FIG. 5a. The circuitry section 130 contains a drive circuit to drive the LCD panel 140 and a control circuit to selectively address the light-emitting source 43 (FIGS. 2a to 3b) to illuminate the keypads 20. By integrating the keymat 10 onto the LCD flex 120, it is possible to print the electrical connectors 50, 52 directly onto the circuitry section 130, along with the LCD drive electronics, thereby minimizing the number of electrical contacts to the keymat 10 down to a few power supply contacts (2 contacts, for example) and data line contacts (one or more).

Figure 5B:
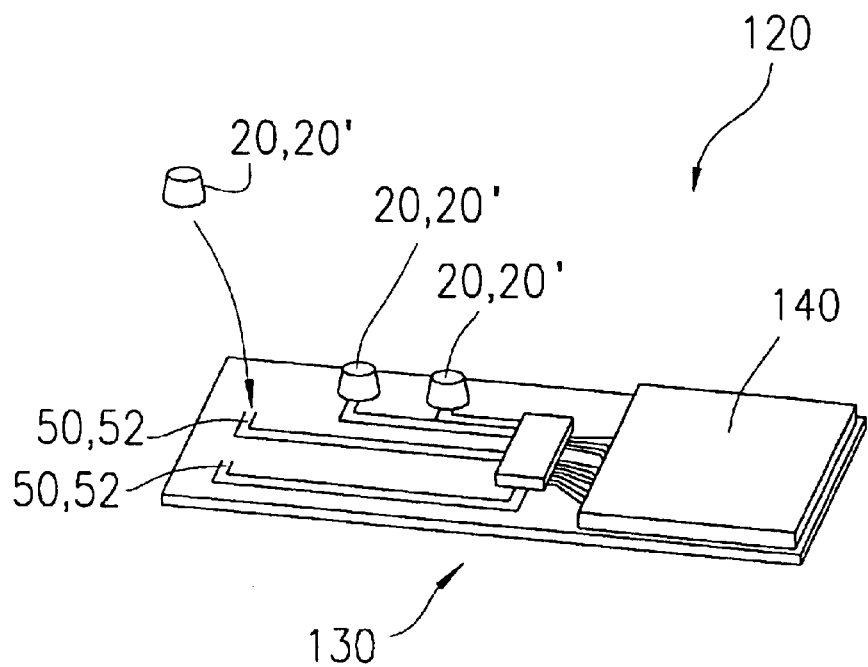
FIG. 5b is a diagrammatic representation illustrating the integration of a plurality of emissive keypads into an LCD flex.

It is also possible to integrate the individual emissive keypads 20 (or 20') onto an LCD flex 120, as shown in FIGS. 5a and 5b, or onto a separate flexible/rigid substrate (not shown) with a self-contained electronic circuitry. The essential components of each emissive keypad 20 include a top layer 30, a transparent top electrode layer 38, a light-emitting layer 40 (or 40'), a bottom electrode layer 42 and the encapsulation layer 44 (or 44') (FIGS. 1a or 1b). For supplying electrical power to the light-emitting layer 40, it is preferred that the electrical connectors 50, 52 be printed on the LCD flex 120, or the separate flexible/rigid substrate. Furthermore, it is preferred that the LCD flex 120 or the separate substrate be provided with a self-contained electronic circuitry.

The integrated keymat 10, 10' (FIG. 5a) can be used on a mobile telephone. For Example, the integrated keymat can be integrated into the front cover of the mobile telephone. The integrated keymat has a plurality of emissive keypads 20, 20' each having a light-emitting source 43 (FIGS. 2a–3b) that can be selectively activated to illuminate the keypad so that the legend on the keypad will become more distinguishable when the ambient light is not adequate. The legend can be a symbol such as "#", text such as "OK", or a combination of alphanumeric symbols such as "5jkl" that are usually used on a mobile. It is possible to paint the top layer 30 (FIG. 1) of the keymat 10 with different colors to obtain a suitable color and appearance of the key.

Figure 6A:
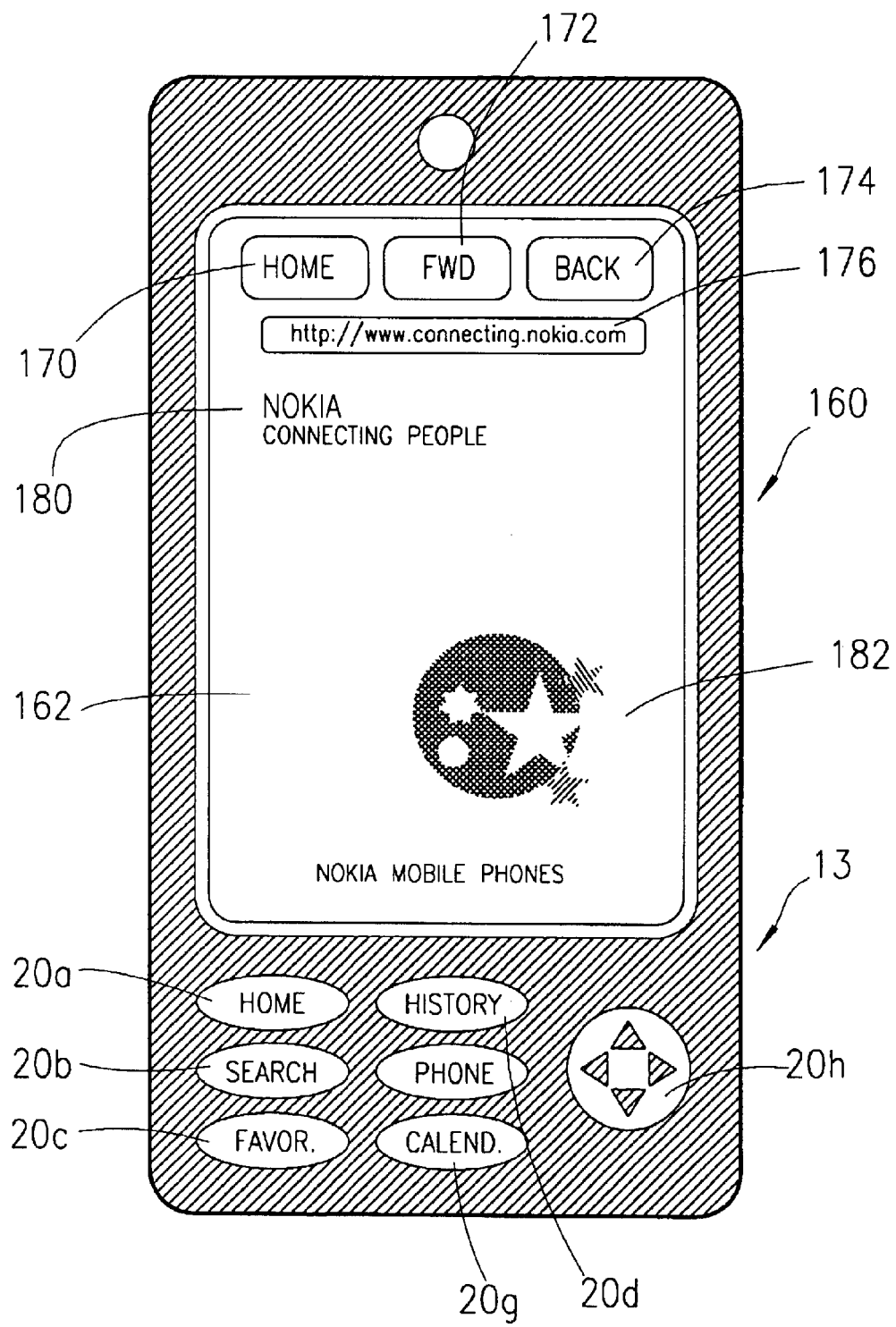
FIG. 6a is a front view illustrating an integrated keymat, which can be used on a portable communications device.
Figure 6B:
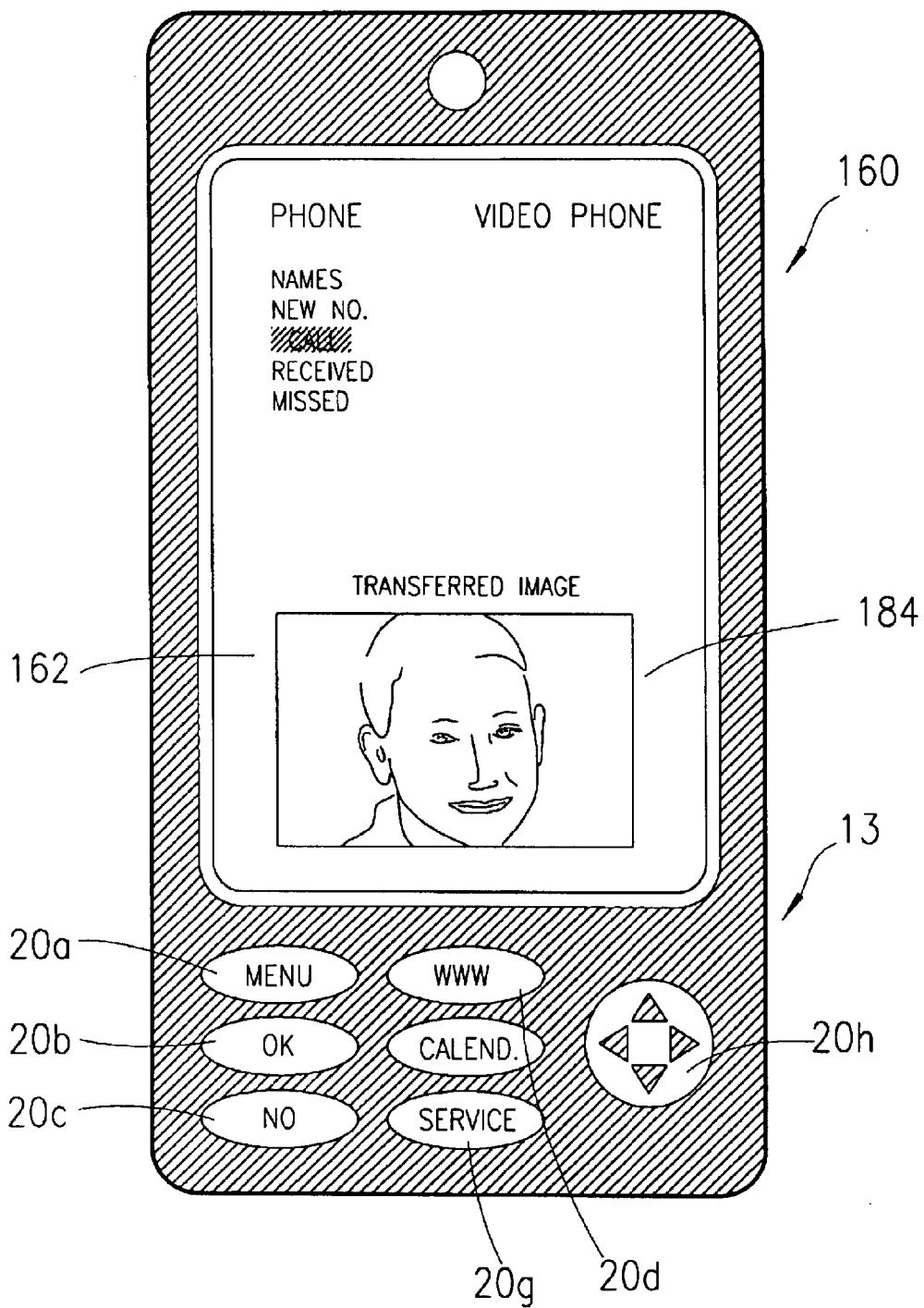
FIG. 6b is a front view illustrating the integrated keymat of FIG. 6a showing different keypad functions.

FIGS. 6a and 6b illustrate an integrated keymat 13 that is integrated into the front cover 160 of a portable communication device. As shown in FIGS. 6a and 7b, the integrated keymat 13 includes a plurality of emissive keypads 20a–20h. It is possible to use a plurality of pixels, as shown in FIG. 2c, or segments, as shown in FIGS. 3a and 3b, to form the legend of the emissive keypads 20a–20h so that the legend can be changed to show different functions associated with the keypads 20a–20h. For example, the portable communications device can be operated in a "Browser" mode, as shown in FIG. 6a, or in a "Phone" mode, as shown in FIG. 6b. When the device is operated in the "Browser" mode, the display panel 162 can be used to display a web-page, for example. The display panel 162 can be used to display a plurality of softkeys 170–174, legends or text 176, 180, graphics 182 and images 184. Accordingly, the legends on the emissive keypads 20a–20h can be programmed to show a plurality of browser-related functions such as "Home", "Search", "Favorite", etc. But when the device is operated in the "Phone" mode, the display panel 162 can be used to display telephone-related information, and the legends on the emissive keypads 20a–20h can be programmed to show a plurality of mobile phone-related functions such as "Menu", "ok", etc. Also, there is an emissive keypad 20d, which is programmed to show a "www" function, allowing the user to switch the device from the "Phone" mode back to the "Browser" mode for fast access to the Internet.

FIGS. 7a and 7b illustrate an integrated keymat 15 that is integrated into an electronic device 200. As shown, the electronic device 200 has a large keypad 230 and group of keypads, collectively denoted by numeral 240. The keypad 230 has a sufficiently large number of pixels such that the keypad 230 can be used as a display device. The display area of the keypad 230 can be divided into a main display area 250 and a soft keyboard 260. The soft keyboard 260 includes a plurality of softkeys, collectively denoted by numeral 270. The soft keyboard 260 can be placed at different locations relative to the main display area 250. As shown in FIG. 7a, the soft keyboard 260 is located below the main display area 250. As shown in FIG. 7b, the soft keyboard 260 is located above the main display area 250. For example, the location of the soft keyboard 260 relative to the main display area 250 can be changed by using a keypad 242 which is located outside the keypad 230. However, the keypad 242 can be implemented as a softkey within the display area of the keypad 230.

FIG. 8a shows that a transparent, lens-like pad 60 is provided on the keypad 20 (or 20') of the integrated keymat 10 (or 10') in order to magnify the legend or marking 34 (see FIGS. 2a and 2b). The transparent, magnifying pad 60 can be molded out of the top layer 30, or provided on the surface of the top layer 30. Thus, the pad 60 and the top layer 30 can be made of the same material or different materials.

Likewise, the transparent, magnifying pad 60 can be provided on the keypad 20 of the integrated keymat 10", as shown in FIG. 8b. The magnifying pad 60 can be produced directly on the top layer 30', or it can be produced separately from the top layer 30' and attached thereon in a separate process. The magnifying pad 60, as shown in FIGS. 8a and 8b, can be used on the integrated keypad 13 to make the legends on the keypads 20a, . . . , 20g, as shown in FIG. 6a and 6b, more legible.

Figure 8C:
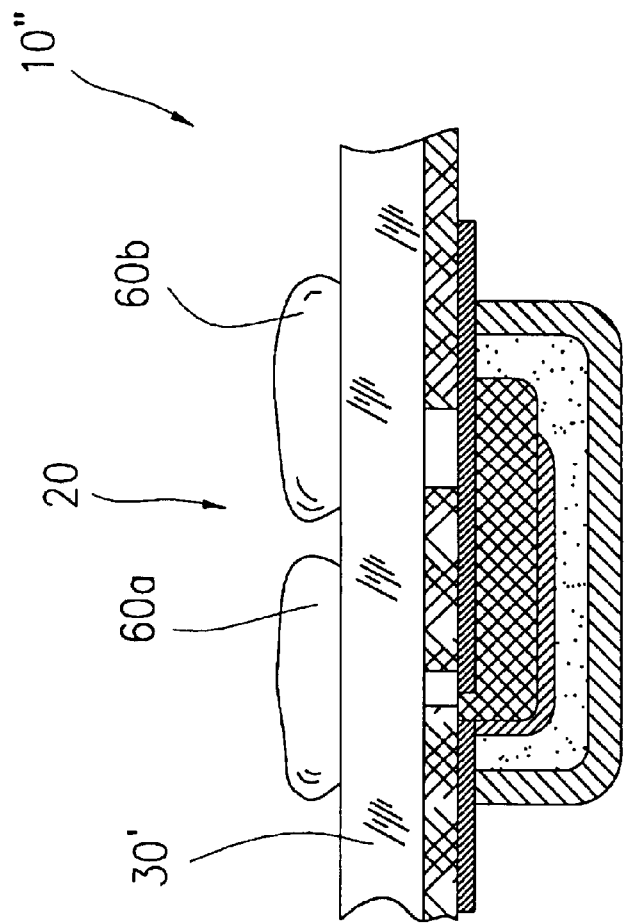
FIG. 8c is a diagrammatic representation illustrating a plurality of transparent, lens-like pads provided on one keypad.

It is possible that two or more magnifying pads 60a, 60b be made on one keypad 20, as shown in FIG. 8c. In this way, the magnifying pads 60a, 60b can be used to separately magnify the different legends or symbols on the same keypad. For example, the magnifying pads 60a, 60b can be used to separately magnify the legends 34a, 34b, as shown in FIG. 2b.

Figure 9:
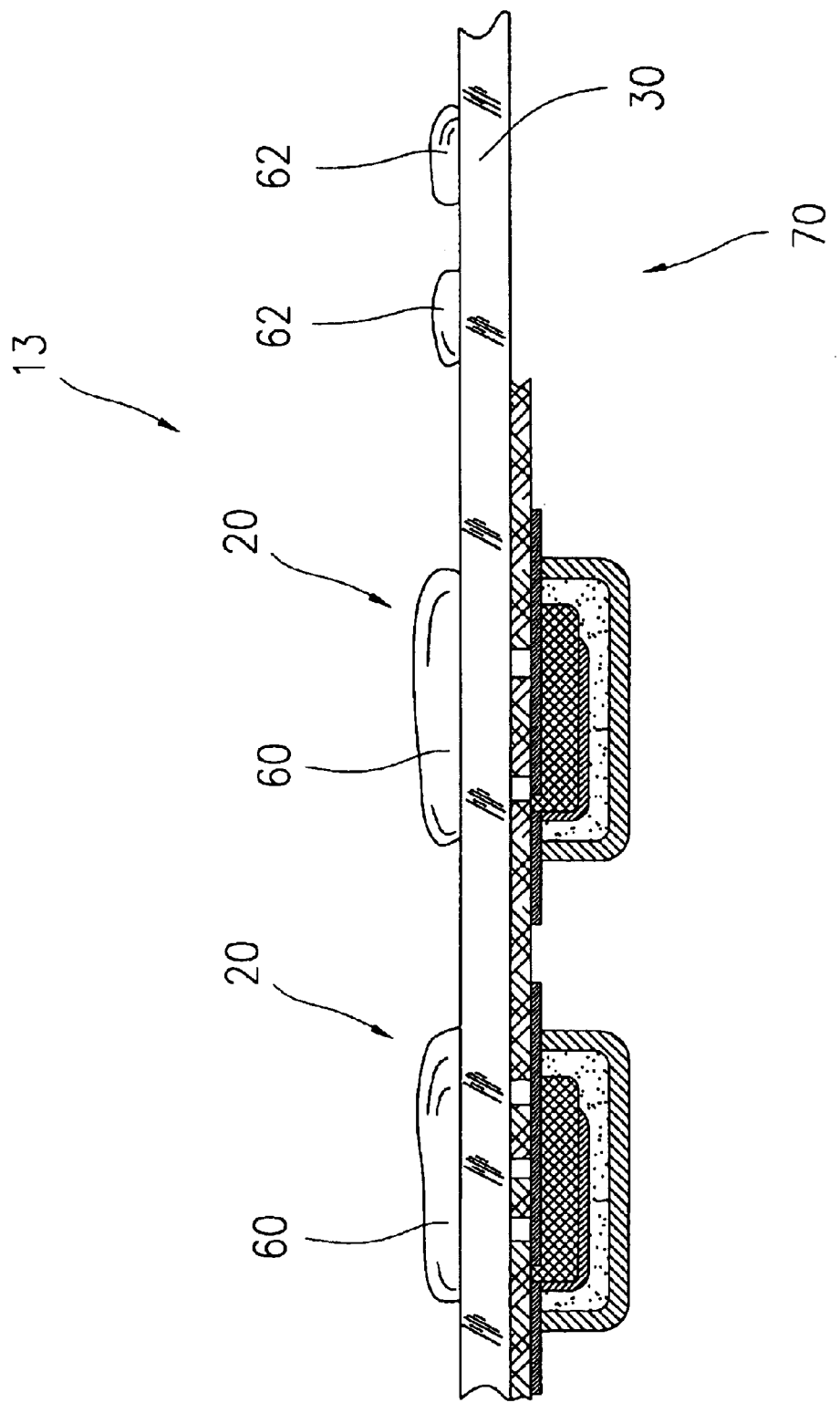
FIG. 9 is a diagrammatic representation illustrating an integrated keymat having a plurality of transparent, lens-like pads.
Figure 10A:
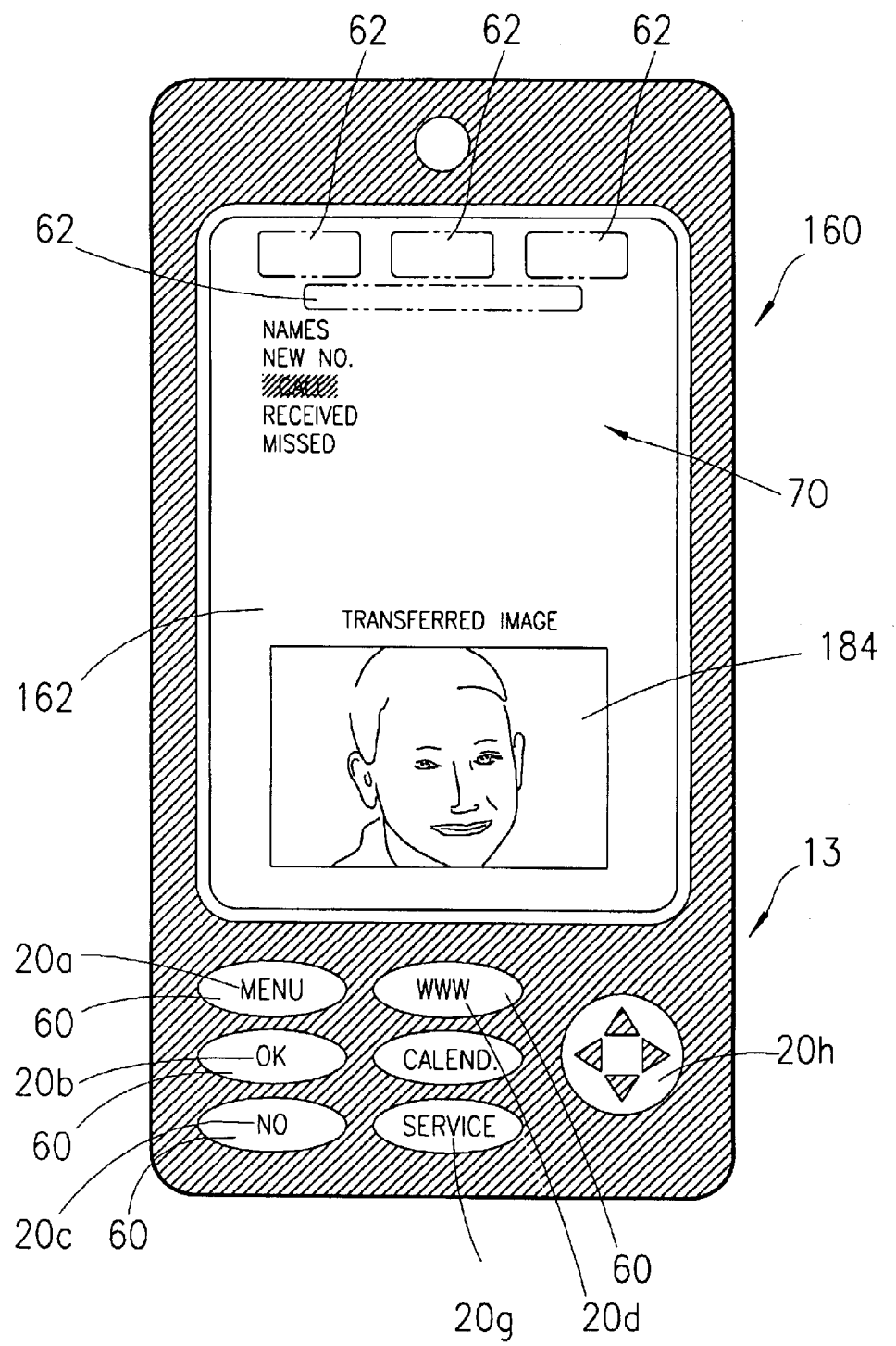
FIG. 10a is a front view illustrating an integrated keymat having a plurality of transparent, lens-like pads being used on a portable communication device.
Figure 10B:
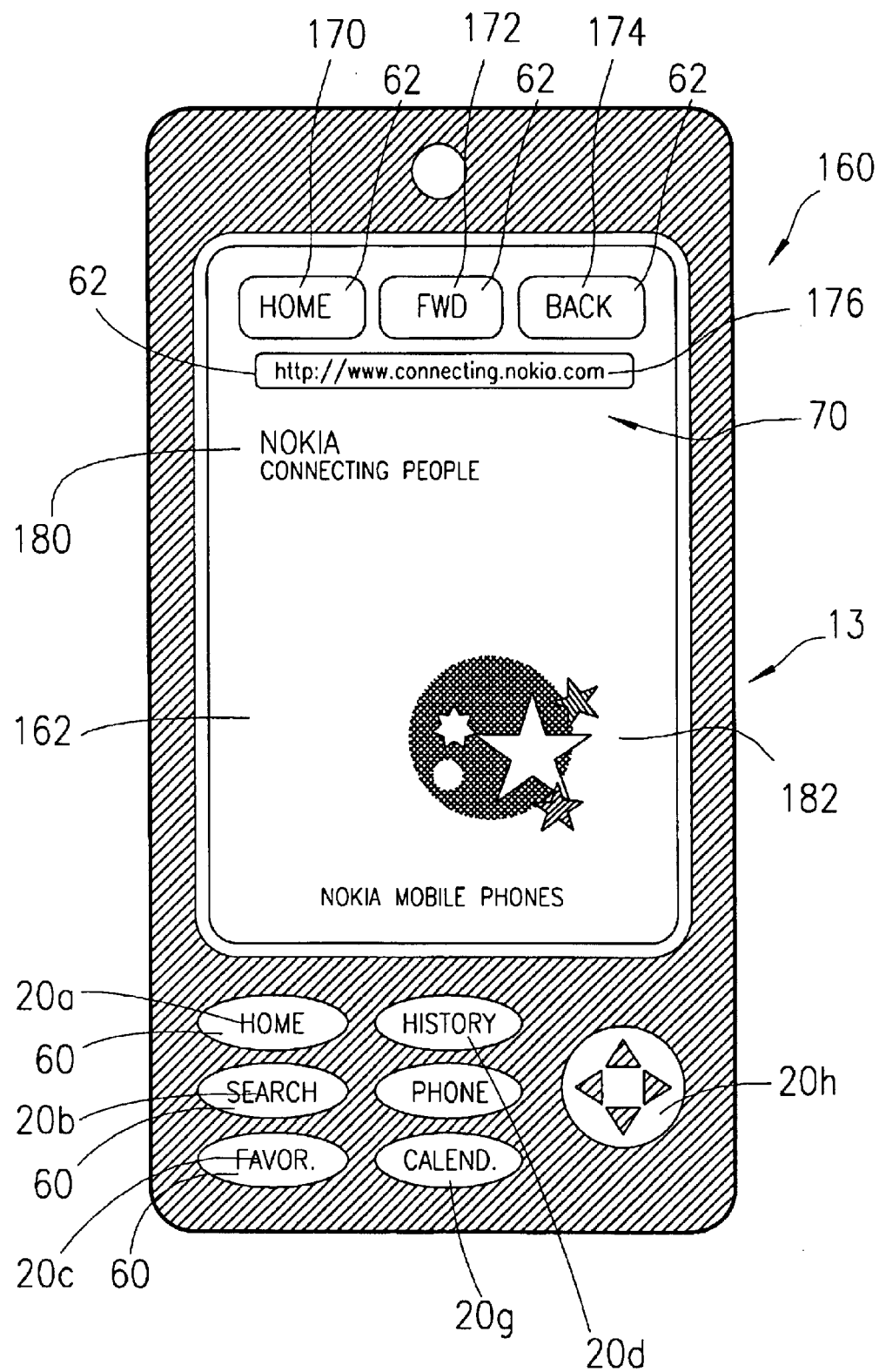
FIG 10b is a front view illustrating the use of transparent, lens-like pads on the portable communication device.

It is also possible to provide one or more magnifying pads 60, 62 on the top layer 30 of an integrated keymat 13, as shown in FIG. 9. As shown, the magnifying pads 60 are provided on the keypads 20 but the magnifying pads 62 are provided on a clear area 70 of the integrated keymat 13. As shown in FIG. 10a, the clear area 70 corresponds to a section of the display panel 162. This section of the display panel 162 can be used to display softkeys 170, 172, 174 and text 176, as shown in FIG. 10b. As shown in FIG. 11b, the magnifying pads 62 make the legends on the softkeys 170, 172, 174 and the text 176 more legible. The magnifying pads 60 make the legends on the regular keys 20a, . . . , 20g more legible.

Thus, the present invention has been disclosed according to a number of embodiments of the integrated keymat, which includes one or more emissive keypads, with the keypads being individually addressable. The light-emitting source in the keypad can comprise a single pixel, two or three pixels, or a large number of pixels organized into a matrix. Likewise, the light-emitting source in the keypad can comprise a plurality of segments to form a segmented type display. That the keypads of an electronic device are selectively illuminated can help guide a user to operate the device. By integrating the light-emissive components onto the keypads, the illumination of the keymat becomes more power-efficient. Emissive keypads having two or more legends selectively shown thereon can be used to replace softkeys.

Although the invention has been described with respect to the preferred embodiments thereof, it will be understood by those skilled in the art that the foregoing and various other changes, omissions and deviations in the form and detail thereof may be made without departing from the spirit and scope of this invention.

What is claimed is:

1. An integrated keyboard (10) having a plurality of keypads (20) to be used in an electronic device, the keypads having a plurality of indication marks (32) associated thereto, said keyboard comprising:
   a substrate (30) for forming said plurality of keypads, the substrate having an upper surface to face a user of the keyboard and an opposing lower surface;
   a plurality of electrical conductors (50, 52), disposed in a layer on the lower surface of the substrate; and
   a plurality of light-emitting sources (43) to illuminate the keypads, wherein the light-emitting sources are adhered on the lower surface of the substrate adjacent to conductors, characterized in that
   each light emitting source comprises a transparent first electrode layer (38) disposed on the lower surface of the substrate, a second electrode layer (42) below the first electrode layer, and a light emitting layer (40) disposed between the first and second electrode layers, wherein the first and second electrode layers are electrically connected to the electrical conductors for activating the light-emitting layer, and wherein the connection of the electrical conductors is controllable so that the light-emitting sources can be selectively activated to illuminate the keypads causing the key indicating marks on the keypads to become more visible.

2. The keyboard of claim 1, wherein the light-emitting source in the keypad comprises a single light-emitting pixel.

3. The keymat of claim 1, wherein the light-emitting source in the keypad comprises at least two light-emitting segments.

4. The keyboard of claim 3, wherein the segments are individually addressable so as to allow the segments to be selectively activated to illuminate said keypad.

5. The keyboard of claim 3, wherein the segments are individually addressable so as to allow the segments to be selectively activated to form a symbol.

6. The keymat of claim 1, wherein the light-emitting source in the keypad comprises a plurality of pixels organized into a matrix, wherein pixels in the matrix are individually addressable so as to allow the pixels to be selectively activated to form an illuminating pattern.

7. The keyboard of claim 1, wherein the light-emitting source comprises a light-emitting layer which is made of an electroluminescence material.

8. The keyboard of claim 1, wherein the light-emitting source comprises an active-matrix electroluminescence device.

9. The keyboard of claim 1, wherein the light-emitting source comprises an actively addressed organic light-emitting device.

10. The keyboard of claim 1, wherein the light-emitting source comprises a passively addressed organic light-emitting device.

11. The keyboard of claim 1, wherein the light-emitting source comprises a light-emitting layer which is made of at least one organic light-emitting material.

12. The keyboard of claim 1, wherein the light-emitting source comprises a light-emitting layer which is made of at least one inorganic light-emitting material.

13. The keyboard of claim 1, wherein the key indicating mark is changeable to show different functions associated with the keypad.

14. The keyboard of claim 1, further comprising at least one magnifying pad provided on the keypad in order to make the key indicating mark more legible.

15. The keyboard of claim 1, further comprising an electronic circuit for controlling the electrodes.

16. The keyboard of claim 15, further comprising a display panel for displaying information to a user of the electronic device, wherein the display panel is operatively connected to the electronic circuit so as to allow the electronic circuit to drive the display panel.

17. The keyboard of claim 16, wherein the display panel is an LCD panel.

18. The keyboard of claim 16, wherein the display panel displays at least one softkey having a legend indicating a function of the softkey, the keyboard further comprising at least one magnifying pad provided on the softkey to make the legend on the softkey more legible.

19. The keyboard of claim 1, wherein the substrate (30) comprises a plurality of recesses (31) for disposing the light emitting sources (43) therein.

20. The keyboard of claim 19, wherein a light penetrable filling (36) is provided in the recesses between the light emitting sources (43) and the lower surface of the substrate.

21. The keyboard of claim 1, wherein the key indicating mark (32) is disposed between the lower surface of the substrate (30) and the light emitting sources (43).

22. An emissive keypad (20) to be integrated into a keyboard (10) of an electronic device, the keypad having a symbol indicative of a function of the electronic device, the keyboard comprising:
   a substrate (30) having an upper surface to face a user of the keyboard and an opposing lower surface; and
   a plurality of electrical conductors (50, 52) disposed in a layer on the lower surface of the substrate for supplying electrical power, said keypad characterized by:
      a light-emitting source (43) adhered on the lower surface of the substrate, the light-emitting source comprising:
         a transparent first electrode layer (38) disposed on the lower surface of the substrate;
         a second electrode layer (42) below the first electrode layer; and
         a light-emitting layer (40) disposed between the first and second electrode layers,
   wherein the first and second electrode layers are electrically connected to the electrical conductors for selectively activating the light-emitting layer to make the symbol more visible.

23. The emissive keypad of claim 22, wherein the light-emitting source comprises a single light-emitting pixel.

24. The emissive keypad of claim 22, wherein the light-emitting source comprises a plurality of pixels organized into a matrix which are individually addressable so as to allow the pixels to be selectively activated to form the symbol.

25. The emissive keypad of claim 22, wherein the symbol is changeable in order to change the function.

26. The emissive keypad of claim 22, wherein the light-emitting source comprises at least two light-emitting segments.

27. The emissive keypad of claim 26, wherein the light-emissive segments are individually addressable so as to allow the segments to be selectively activated to illuminate said keypad.

28. The emissive keypad of claim 26, wherein the light-emissive segments are individually addressable so as to allow the segments to be selectively activated to form the symbol.

29. The emissive keypad of claim 22, wherein the keyboard comprises an electronic circuit for controlling the activation of the light-emitting source.

30. The emissive keypad claim 29, wherein the keyboard further comprises a display panel for displaying information to a user of the electronic device, wherein the display panel is operatively connected to the electronic circuit so as to allow the electronic circuit to drive the display panel.

31. The emissive keypad of claim 22, wherein the substrate (30) comprises a plurality of recesses (31), and wherein the light emitting source (43) is disposed in one of the recesses (31).

32. The emissive keypad of claim 31, wherein a light penetrable filling (36) is provided between the light emitting source (43) and the lower surface of the substrate in said one of the recesses (31).

33. The emissive keypad of claim 22, wherein the key indicating mark (32) is disposed between the lower surface of the substrate (30) and the light emitting source (43).

34. A portable communication device (160), comprising:
   an integrated keyboard (10) including a plurality of keypads (20) having a plurality of key indicating marks (32) provided thereon; and
   a circuitry section, wherein the integrated keyboard (10) comprises:
      a substrate (30) for forming said plurality of keypads (20), the substrate having an upper surface to face a user of the keyboard and an opposing lower surface;
      a plurality of light-emitting sources (43) adhered on the substrate to illuminate the keypads; and
      a plurality of electrical conductors (50, 52), operatively connected to a power source, for activating the light-emitting source, said device characterized in that
   each light emitting source comprises a transparent first electrode layer (38) disposed on the lower surface of the substrate, a second electrode layer (42) below the first electrode layer, and a light emitting layer (40) disposed between the first and second electrode layers, wherein the first and second electrode layers are electrically connected to the electrical conductors for activating the light-emitting layer, and wherein the connection of the electrical conductors is controllable by the circuitry section so that the light-emitting sources can be selectively activated to illuminate the keypads causing the key indicating marks on the keypads to become more visible.

35. The portable communication device of claim 34, wherein at least one of the light-emitting sources in the keypads comprises a single light-emitting pixel.

36. The portable communication device of claim 34, wherein at least one of the light-emitting sources in the keypads comprises at least two light-emitting segments.

37. The portable communication device of claim 36, wherein the segments are individually addressable so as to allow the segments to be selectively activated to illuminate said keypads.

38. The portable communication device of claim 36, wherein the segments are individually addressable so as to allow the segments to be selectively activated to form a symbol.

39. The portable communication device of claim 34, wherein the light-emitting sources in the keypads comprise a plurality of pixels organized into a matrix, wherein pixels in the matrix are individually addressable so as to allow the pixels to be selectively activated to form an illuminating pattern.

40. The portable communication device of claim 34, wherein the light-emitting sources comprise a light-emitting layer, which is made of an electroluminescence material.

41. The portable communication device of claim 34, wherein the light-emitting sources comprise an active-matrix electroluminescence device.

42. The portable communication device of claim 34, wherein the light-emitting sources comprise an actively addressed organic light-emitting device.

43. The portable communication device of claim 34, wherein the light-emitting sources comprise a passively addressed organic light-emitting device.

44. The portable communication device of claim 34, wherein the light-emitting sources comprise a light-emitting layer, which is made of at least one organic light-emitting material.

45. The portable communication device of claim 34, wherein the light-emitting sources comprise a light-emitting layer, which is made of at least one inorganic light-emitting material.

46. The portable communication device of claim 34, wherein the key indicating mark is changeable to show different functions associated with the keypad.

47. The portable communication device of claim 34, further comprising:
   an electronic circuit for controlling the electrodes; and
   a display panel for displaying information to a user, wherein the display panel is operatively connected to the electronic circuit for driving the display panel.

48. The portable communication device of claim 47, wherein the display panel displays at least one softkey having a legend indicating a function of the softkey.

49. The portable communication device of claim 34, wherein the substrate (30) comprises a plurality of recesses (31) for disposing the light emitting sources (43) therein.

50. The portable communication device of claim 49, wherein a light penetrable filling (36) is provided between the light emitting sources (43) and the lower surface of the substrate (30).

51. The portable communication device of claim 34, wherein the key indicating mark (32) is disposed between the lower surface of the substrate (30) and the light emitting sources (43).

* * * * *

UNITED STATES PATENT AND TRADEMARK OFFICE
CERTIFICATE OF CORRECTION

PATENT NO.     : 6,704,004 B1
DATED          : March 9, 2004
INVENTOR(S)    : Toni Östergård et al.

It is certified that error appears in the above-identified patent and that said Letters Patent is hereby corrected as shown below:

<u>Title page,</u>
Item [75], Inventors, insert -- Kimmo Järvinen, Salo (FI) --

Signed and Sealed this

Third Day of May, 2005

JON W. DUDAS
*Director of the United States Patent and Trademark Office*